(12) United States Patent
Chikada

(10) Patent No.: US 9,688,313 B2
(45) Date of Patent: Jun. 27, 2017

(54) VEHICLE HOOD STRUCTURE

(71) Applicant: Simpei Chikada, Toyota (JP)

(72) Inventor: Simpei Chikada, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 14/761,590

(22) PCT Filed: Apr. 1, 2013

(86) PCT No.: PCT/JP2013/060009
§ 371 (c)(1),
(2) Date: Jul. 16, 2015

(87) PCT Pub. No.: WO2014/122802
PCT Pub. Date: Aug. 14, 2014

(65) Prior Publication Data
US 2015/0360729 A1    Dec. 17, 2015

(30) Foreign Application Priority Data
Feb. 8, 2013    (JP) .................................. 2013-023712

(51) Int. Cl.
*B62D 25/12*    (2006.01)
*B60R 21/34*    (2011.01)
*B62D 25/10*    (2006.01)

(52) U.S. Cl.
CPC .............. *B62D 25/12* (2013.01); *B60R 21/34* (2013.01); *B62D 25/105* (2013.01); *B60R 2021/343* (2013.01)

(58) Field of Classification Search
CPC ...... B62D 25/10; B62D 25/12; B62D 25/105; B60R 21/34; B60R 21/38; B60R 2021/134; B60R 2021/343

(Continued)

(56) References Cited

U.S. PATENT DOCUMENTS

2004/0021342 A1*    2/2004    Fujimoto ................ B60R 21/34
                                                    296/193.11
2009/0302644 A1*    12/2009    Mori ....................... B60R 21/38
                                                    296/193.11

(Continued)

FOREIGN PATENT DOCUMENTS

DE    100 38 812 A1    2/2002
DE    10340954    *    4/2005

(Continued)

OTHER PUBLICATIONS

Jun. 4, 2013 International Search Report issued in International Application No. PCT/JP2013/060009.

(Continued)

*Primary Examiner* — Dennis H Pedder
(74) *Attorney, Agent, or Firm* — Oliff PLC

(57) ABSTRACT

A vehicle hood structure, which includes an outer panel that forms an outer surface of a vehicle, an inner panel that is disposed below the outer panel and fixedly attached to the outer panel and that has a plurality of beam portions extending in a longitudinal direction of the vehicle, having a hat-shaped section opening downward, and being separated from each other in a lateral direction of the vehicle, and which covers a front part of the vehicle, the vehicle hood structure including: a reinforcing member that is disposed below the inner panel so as to extend in the lateral direction of the vehicle and to have clearance between the reinforcing member and the beam portions, that has a convex shape curved upward in the lateral direction of the vehicle, and that is fixedly fastened at its both ends in the lateral direction of the vehicle to the inner panel.

8 Claims, 11 Drawing Sheets

(58) Field of Classification Search
USPC .................................................. 296/193.11
See application file for complete search history.

(56) References Cited

U.S. PATENT DOCUMENTS

| | | | |
|---|---|---|---|
| 2010/0019540 A1* | 1/2010 | Fujimoto | B60R 21/34 296/193.11 |
| 2011/0115260 A1* | 5/2011 | Mizuta | B62D 25/00 296/203.01 |
| 2014/0062141 A1 | 3/2014 | Townson et al. | |

FOREIGN PATENT DOCUMENTS

| | | | |
|---|---|---|---|
| DE | 102005054460 | * | 5/2007 |
| DE | 10 2010 044 668 A1 | | 3/2012 |
| EP | 1829769 A1 | | 9/2007 |
| GB | 2484180 A | | 4/2012 |
| JP | 2004-136810 A | | 5/2004 |
| JP | 2007-223414 A | | 9/2007 |
| WO | 2012/157100 A1 | | 11/2012 |

OTHER PUBLICATIONS

Aug. 17, 2016 Office Action issued in Chinese Application No. 201380071990.1.
Sep. 16, 2014 European Search Report issued in European Application No. 13874765.4.
Mar. 6, 2017 Office Action issued in Chinese Application No. 201380071990.1.

* cited by examiner

COLLIDING BODY COLLIDES

OUTER PANEL AND INNER PANEL ARE DEFORMED

REINFORCING MEMBER IS DEFORMED

US 9,688,313 B2

VEHICLE HOOD STRUCTURE

TECHNICAL FIELD

The present invention relates to vehicle hood structures, and more particularly to a technique of ensuring lateral stiffness of a hood without impairing shock absorbing performance against a colliding body.

BACKGROUND ART

Vehicle hood structures are known which include (a) an outer panel that forms an outer surface of a vehicle, (b) an inner panel that is disposed below the outer panel and fixedly attached to the outer panel and that has a plurality of beam portions extending in the longitudinal direction of the vehicle, having a hat-shaped section opening downward, and being separated from each other in the lateral direction of the vehicle, and which (c) covers a front part of the vehicle. Patent Document 1 describes an example of such vehicle hood structures. Patent Document 2 proposes a technique of disposing a reinforcing member (transverse beam member 20) in the lateral direction of the vehicle to ensure predetermined lateral stiffness (surface stiffness in the lateral direction of the vehicle).

RELATED ART DOCUMENTS

Patent Documents

Patent Document 1: Japanese Patent Application Publication No. 2004-136810
Patent Document 2: Japanese Patent Application Publication No. 2007-223414

SUMMARY OF THE INVENTION

Problems to be Solved by the Invention

However, the above reinforcing member is disposed between the outer panel and the inner panel, and is fixedly fastened to both the beam portions of the inner panel and the outer panel. This ensures high lateral stiffness, but may impair shock absorbing performance against a colliding body.

The present invention was developed in view of the above circumstances, and it is an object of the present invention to improve lateral stiffness of a hood without impairing shock absorbing performance against a colliding body.

Means for Solving the Problem

To achieve the object, the first aspect of the invention provides a vehicle hood structure, which includes (a) an outer panel that forms an outer surface of a vehicle, (b) an inner panel that is disposed below the outer panel and fixedly attached to the outer panel and that has a plurality of beam portions extending in a longitudinal direction of the vehicle, having a hat-shaped section opening downward, and being separated from each other in a lateral direction of the vehicle, and which (c) covers a front part of the vehicle, the vehicle hood structure characterized by comprising: (d) a reinforcing member that is disposed below the inner panel so as to extend in the lateral direction of the vehicle and to have clearance between the reinforcing member and the beam portions, that has a convex shape curved upward in the lateral direction of the vehicle, and that is fixedly fastened at its both ends in the lateral direction of the vehicle to the inner panel.

The second aspect of the invention provides the vehicle hood structure recited in the first aspect of the invention, characterized in that the reinforcing member has a bead protruding upward or downward and extending in a longitudinal direction of the reinforcing member which is the lateral direction of the vehicle.

The third aspect of the invention provides the vehicle hood structure recited in the first or second aspect of the invention, characterized in that the reinforcing member has a dish-shaped section that opens upward, as taken perpendicularly to the longitudinal direction of the reinforcing member which is the lateral direction of the vehicle, and a deformation facilitating portion that facilitates deformation of sidewalls on both sides of the dish shape is provided in a corner of the dish shape (a root portion of each sidewall).

The fourth aspect of the invention provides the vehicle hood structure recited in any one of the first to third aspects of the invention, characterized in that the reinforcing member is disposed in such a tilted attitude that the size of the clearance between the reinforcing member and the beam portions changes in the longitudinal direction of the vehicle.

The fifth aspect of the invention provides the vehicle hood structure recited in any one of the first to fourth aspects of the invention, characterized in that a hood lock striker is attached to the reinforcing member or the inner panel on each of right and left sides of the vehicle hood.

The sixth aspect of the invention provides the vehicle hood structure recited in any one of the first to fifth aspects of the invention, characterized in that a coupling portion for a hood opening/closing damper is provided on each end in the longitudinal direction of the reinforcing member which is the lateral direction of the vehicle.

Effects of the Invention

In such a vehicle hood structure, the reinforcing member having a convex shape curved upward in the lateral direction of the vehicle is disposed below the inner panel so as to have predetermined clearance between the reinforcing member and the beam portions, and is fixedly fastened at its both ends in the lateral direction of the vehicle to the inner panel. Lateral stiffness of the vehicle hood is thus increased. Thickness of the outer panel and the inner panel can thus be reduced, and reduction in weight can be achieved.

If a colliding body collides with the hood, the reinforcing member, as well as the outer panel and the inner panel, is pressed downward and flexurally deformed, and the beam portions are pressed at their openings against the reinforcing member. Accordingly, even before the reinforcing member comes into contact with a component such as an engine located inside the hood, the beam portions are smoothly deformed to open outward on the opening side of the hat-shaped section along the reinforcing member, and collision energy is appropriately absorbed by the deformation. Since there is predetermined clearance between the inner panel and the reinforcing member, only the outer panel and the inner panel are deformed until the inner panel comes into contact with the reinforcing member. The impact in case of a slight collision is thus appropriately reduced. Even after the inner panel comes into contact with the reinforcing member, the inner panel and the reinforcing member are allowed to shift (slide) relative to each other to some extent. The inner panel and the reinforcing member are therefore shifted relative to each other according to the position of collision with the colliding body, the load direction, etc., whereby a collision load is released and the impact is appropriately reduced. Moreover, the reinforcing member is interposed between the inner panel and the component. Accordingly, even if the deformation of the hood proceeds and the hood interferes with the component such as the engine, the deformation is less likely to be hindered by, e.g., the beam portions being caught by the component, and predetermined shock absorbing performance due to the deformation of the beam portions is ensured. That is, regardless of the presence of the reinforcing member provided to increase the lateral stiffness, collision energy is appropriately absorbed by the deformation of each part, and excellent shock absorbing performance is obtained.

In the second aspect of the invention, the reinforcing member has a bead. In this case, since the bead increases stiffness of the reinforcing member, the lateral stiffness of the vehicle hood can further be improved. Moreover, since the reinforcing member including the bead is deformed upon collision with the colliding body, collision energy absorption performance can further be enhanced.

In the third aspect of the invention, the reinforcing member has a dish-shaped section that opens upward. This increases stiffness of the reinforcing member, and therefore the lateral stiffness of the vehicle hood can further be improved. Moreover, since the beam portions of the inner panel are pressed against the reinforcing member and the sidewalls are deformed from the dish shape upon collision with the colliding body, collision energy absorption performance can further be enhanced. Since the deformation facilitating portion that facilitates deformation of the sidewalls is formed in the corners of the dish shape, the sidewalls are easily deformed to fall when the beam portions of the inner panel are pressed against the reinforcing member upon collision with the colliding body. An initial load is thus reduced. Moreover, with the sidewalls having fallen, the reinforcing member is flexurally deformed relatively easily, and therefore exertion of excessive impact on the colliding body is suppressed regardless of the increased stiffness.

In the fourth aspect of the invention, the reinforcing member is disposed in a tilted attitude with respect to the beam portions. In this case, when the beam portions of the inner panel are pressed against the reinforcing member upon collision with the colliding body, the beam portions partially contact with the reinforcing member. An initial load is thus reduced, and the reaction force of the reinforcing member is gradually increased. The impact on the colliding body is therefore appropriately reduced.

In the fifth aspect of the invention, the hood lock striker is attached to the right and left sides of the vehicle hood, and the vehicle hood is held (locked) closed by latching the strikers by the hood lock devices provided on vehicle body-side members such as apron upper members. Since the right and left sides of the vehicle hood are thus fixed to a vehicle body-side member, the lateral stiffness of the vehicle hood is further improved, and a collision load applied to one of the right and left sides is transmitted to the other side via the reinforcing member. The load is thus dispersed and local damage is suppressed.

In the sixth aspect of the invention, the hood opening/closing dampers are coupled to both ends of the reinforcing member. Accordingly, a reaction force that is applied from the dampers when the hood is opened or closed is transmitted to the inner panel via the reinforcing member. This can suppress deformation of the inner panel due to the reaction force, and can reduce the thickness and weight of the inner panel.

MODES FOR CARRYING OUT THE INVENTION

Figure 1:
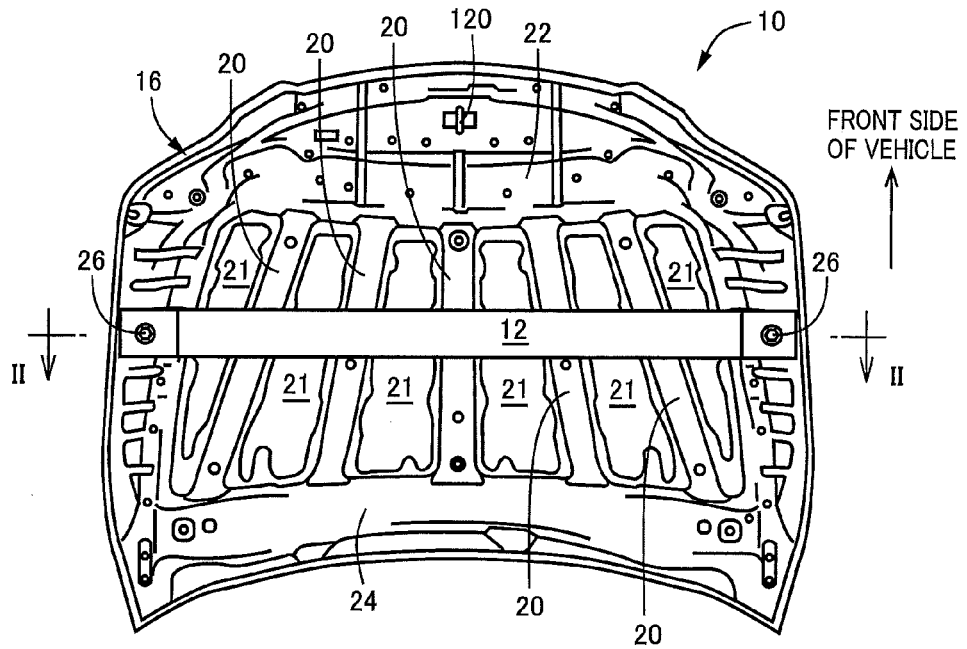
FIG. 1 is a front view of a vehicle hood to which the present invention is applied as viewed from the inside.

The present invention is preferably applied to a vehicle hood that is disposed in the front part of the vehicle substantially horizontally or in such a tilted attitude that the vehicle hood is tilted downward closer to the front end. The outer panel and the inner panel can be in various forms such as a convex shape curved upward in the lateral direction of the vehicle inverted dish shape or a substantially flat shape. The outer panel and the inner panel are fixedly fastened to each other at their outer peripheral edges by crimping, welding etc. There may be clearance between the outer panel and the beam portions of the inner panel. However, the outer panel may closely contact the beam portions of the inner panel, or may be partially fixedly bonded to the beam portions of the inner panel by a sealing agent as necessary. For example, the beam portions are provided in a radial pattern as viewed in plan such that the interval between the beam portions decreases closer to the front of the vehicle. However, the beam portions may be provided so as to be substantially parallel to each other. The pattern in which the beam portions are provided is determined as appropriate based on the shape of the vehicle hood.

The beam portions having the hat-shaped section opening downward desirably have a trapezoidal section having a greater lateral dimension closer to the opening of the hat-shaped section. However, these beam portions may have a quadrilateral (square or rectangular) section having a substantially uniform lateral dimension. The beam portions are coupled to each other at their both ends in the longitudinal direction via coupling portions to form a part of the inner panel. The reinforcing member is formed by, e.g., an elongated sheet metal material, and is provided in a strip shape in the lateral direction of the vehicle. Only one reinforcing member may be provided under intermediate portions of the beam portions in the longitudinal direction of the vehicle. However, a plurality of the reinforcing members may be provided so as to be separated from each other in the longitudinal direction of the vehicle and to be substantially parallel to each other. The reinforcing member is directly or indirectly fixedly fastened to the inner panel by using fixing means such as crimping, welding, an adhesive, or a screw.

The bead of the second aspect of the invention may be in various forms, i.e., may have a U-shaped section, a V-shaped section, or a semicircular section, and is provided in the middle in the lateral direction of the strip plate-shaped reinforcing member (the longitudinal direction of the vehicle) so as to extend along the entire length in the longitudinal direction of the reinforcing member. Two or more of the beads may be provided so as to be separated from each other in the lateral direction of the reinforcing member and to be parallel to each other. For example, such a bead can be formed by plastic deformation using press bending, press drawing, etc. A flat reinforcing member having no bead can be used when carrying out other aspects of the invention.

The reinforcing member of the third aspect of the invention has the dish-shaped section, namely a relatively shallow angular U-shaped section, and the deformation facilitating portion is provided in the corner of the dish shape. However, the deformation facilitating portion may be omitted when carrying out other aspects of the invention. The deformation facilitating portion is provided in order to make it easier for the sidewalls to fall outward or inward of the dish shape, and a brittle portion such as a groove or dashed-line shaped slits is appropriate as the deformation facilitating portion. It is desirable to tilt a pair of the sidewalls on both sides of the dish shape outward so that the sidewalls are more separated from each other closer to their tip ends. However, the pair of sidewalls may be provided parallel to each other so as to stand substantially at right angles. The bead of the second aspect of the invention may be provided in the bottom of the dish shape.

In the fourth aspect of the invention, the reinforcing member is disposed in such a tilted attitude with respect to the beam portions that the dimension of the clearance between the reinforcing member and the beam portions changes in the longitudinal direction of the vehicle. However, when carrying out other aspects of the invention, the reinforcing member may be disposed substantially parallel to the beam portions so that the dimension of the clearance between the reinforcing member and the beam portions is substantially uniform in the longitudinal direction of the vehicle. The reinforcing member may be disposed in the tilted attitude such that the clearance decreases closer to the front of the vehicle or the clearance decreases closer to the rear of the vehicle in the longitudinal direction of the vehicle. The dimension of the clearance between the plurality of beam portions and the reinforcing member in the lateral direction of the vehicle is determined based on the shapes of the reinforcing member having the curved shape and the inner panel, and may be implemented in various forms. For example, the dimension of the clearance between the plurality of beam portions and the reinforcing member in the lateral direction of the vehicle may be substantially uniform, or may be reduced in the middle in the lateral direction and increased on both ends in the lateral direction.

Embodiments

Embodiments of the present invention will be described in detail below with reference to the accompanying drawings.

Figure 2:
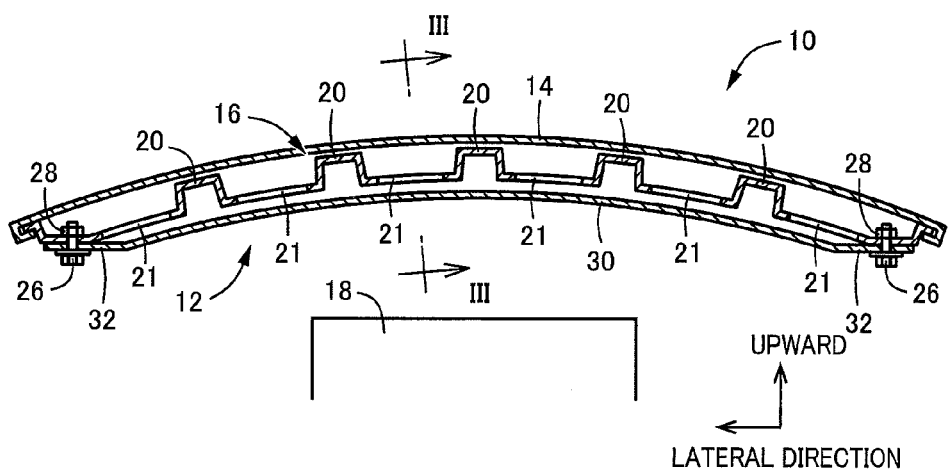
FIG. 2 is a sectional view of a portion with a reinforcing member attached thereto, taken along and viewed in the direction shown by arrows II-II in FIG. 1.
Figure 3:
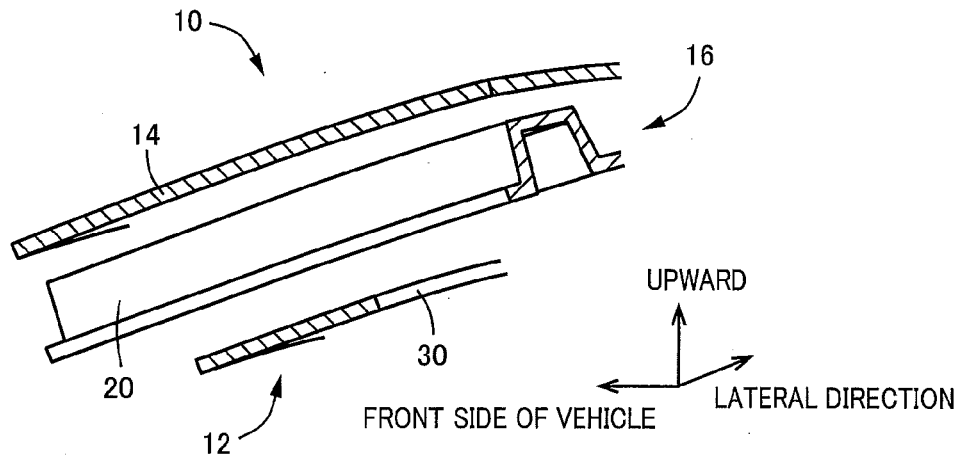
FIG. 3 is a perspective view of a section taken along and viewed in the direction shown by arrows III-III in FIG. 2.
Figure 4:
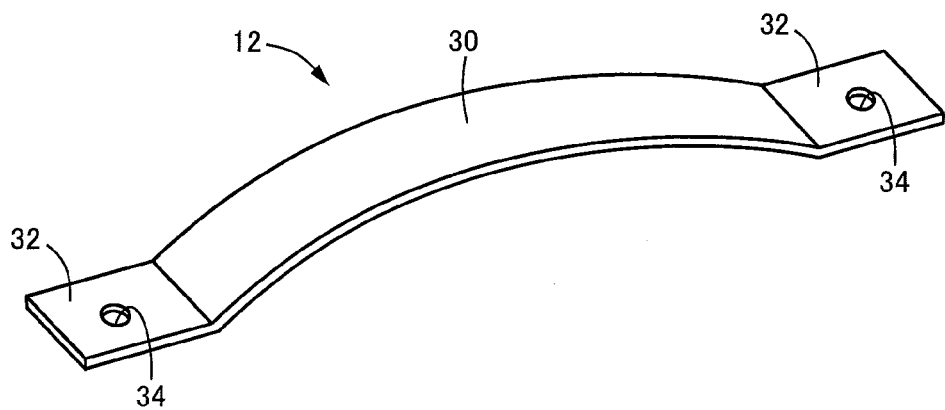
FIG. 4 is a perspective view showing only the reinforcing member provided in the vehicle hood in FIG. 1.

FIG. 1 is a front view of a vehicle hood 10 according to an embodiment of the present invention as viewed from the inside (the back side), and the upper side corresponds to the front side of a vehicle. FIG. 2 is a sectional view of a portion with a reinforcing member 12 attached thereto, taken along and viewed in the direction shown by arrows II-II in FIG. 1. FIG. 3 is a perspective view of a section taken along and viewed in the direction shown by arrows III-III in FIG. 2. FIG. 4 is a perspective view showing only the reinforcing member 12. The vehicle hood 10 is intended to cover the upper part of an engine compartment located in the front part of the vehicle, and is disposed in such an attitude that the vehicle hood 10 is tilted slightly downward toward the front of the vehicle. A component 18 such as an engine is provided in the engine compartment covered by the vehicle hood 10. FIG. 2 is a schematic sectional view, and the vehicle hood 10 is curved in an arc shape in the lateral direction of the vehicle. However, the vehicle hood 10 need only be curved in a convex shape as a whole, and may be partially flat, uneven, etc.

The vehicle hood 10 includes an outer panel 14 forming an outer surface of the vehicle, and an inner panel 16 disposed below the outer panel 14. The outer panel 14 has a convex shape that protrudes and is curved upward of the vehicle in the middle in the lateral direction of the vehicle. The inner panel 16 is disposed below the outer panel 14 so as to extend substantially parallel to the outer panel 14 along the curved shape of the outer panel 14. Each of the outer panel 14 and the inner panel 16 is formed by a sheet metal material. The outer panel 14 and the inner panel 16 are placed on top of each other and are fixedly fastened to each other at their outer peripheral edges by crimping, welding etc. so that the outer panel 14 and the inner panel 16 have a closed section structure.

The inner panel 16 has a plurality (in the embodiment, five) of beam portions 20 extending in the longitudinal direction of the vehicle and having a hat-shaped section that opens downward. There is slight clearance between each beam portion 20 and the outer panel 14. The beam portions 20 are separated from each other in the lateral direction of the vehicle by holes 21, and each beam portion 20 is integrally coupled at its both ends in the longitudinal direction of the vehicle to a front coupling portion 22 and a rear coupling portion 24 of the inner panel 16. The holes 21 are formed so that the beam portions 20 have a hat-shaped section, namely so that each beam portion 20 has flange portions that are bent outward from tip ends of a pair of side wall portions of the beam portion 20 and that have a predetermined lateral dimension. In the front view of FIG. 1, the beam portions 20 are provided in a radial pattern such that the interval between the beam portions 20 decreases slightly closer to the front of the vehicle. Moreover, the hat-shaped section that opens downward has a trapezoidal shape having a greater lateral dimension closer to the opening of the hat-shaped section. Both the outer panel 14 and the inner panel 16 are produced by press punching, press bending, press drawing, etc.

The reinforcing member 12 is formed of an elongated strip-shaped sheet metal material, and is disposed below the inner panel 16 so as to extend in the lateral direction of the vehicle along the curved shape and to have clearance between the reinforcing member 12 and the beam portions 20. The reinforcing member 12 is fixedly fastened at its both ends in the lateral direction of the vehicle to the inner panel 16 at positions near outer peripheral edges of the inner panel 16, namely near joint portions between the inner panel 16 and the outer panel 14, by using screws 26. Nuts 28 are fixedly attached to the upper surface of the inner panel 16, namely the surface on the outer panel 14 side of the inner panel 16, by welding etc., and the both ends of the reinforcing member 12 are fixedly fastened to the inner panel 16 by tightening the screws 26 into the nuts 28. As can be seen from the perspective view of FIG. 4, the reinforcing member 12 includes a curved portion 30 curved along the curved shape of the inner panel 16, and flat attachment portions 32 provided at both ends of the curved portion 30. Each attachment portion 32 has an insertion hole 34 through which the screw 26 is inserted. The curved portion 30 is curved like an arch so as to form a substantially arc shape. As can be seen from FIG. 3, the curved portion 30 is formed so as to extend substantially parallel to the inner panel 16 in the longitudinal direction of the vehicle, namely so as to have substantially constant clearance between the curved portion 30 and the beam portions 20. Such a reinforcing member 12 is easily produced by, e.g., press punching or press bending. In the present embodiment, only one reinforcing member 12 is provided at an intermediate position of the beam portions 20 in the longitudinal direction of the vehicle.

In such a vehicle hood 10, the reinforcing member 12 having the curved shape is disposed below the inner panel 16 so as to have predetermined clearance between the reinforcing member 12 and the beam portions 20, and is fixedly fastened at its both ends in the lateral direction of the vehicle to the inner panel 16. Lateral stiffness of the vehicle hood 10 is thus increased. Thickness of the outer panel 14 and the inner panel 16 can thus be reduced, and reduction in weight can be achieved.

As shown in FIG. 5, if a colliding body 36 collides with the vehicle hood 10, the reinforcing member 12, as well as the outer panel 14 and the inner panel 16, is pressed downward and flexurally deformed, and the beam portions 20 are pressed at their openings against the reinforcing member 12. Accordingly, even before the reinforcing member 12 comes into contact with the component 18 such as the engine located inside the hood, the beam portions 20 are smoothly deformed to open outward on the opening side of the hat-shaped section along the reinforcing member 12, and collision energy is appropriately absorbed by the deformation. Since there is predetermined clearance between the inner panel 16 and the reinforcing member 12, only the outer panel 14 and the inner panel 16 are deformed until the inner panel 16 comes into contact with the reinforcing member 12. The impact in case of a slight collision is thus appropriately reduced. Even after the inner panel 16 comes into contact with the reinforcing member 12, the inner panel 16 and the reinforcing member 12 are allowed to shift (slide) relative to each other to some extent. The inner panel 16 and the reinforcing member 12 are therefore shifted relative to each other according to the position of collision with the colliding body 36, the load direction, etc., whereby a collision load is released and the impact is appropriately reduced. Moreover, the reinforcing member 12 is interposed between the inner panel 16 and the component 18. Accordingly, even if the deformation of the hood 10 proceeds and the hood 10 interferes with the component 18 such as the engine, the deformation is less likely to be hindered by, e.g., the beam portions 20 being caught by the component 18, and predetermined shock absorbing performance due to the deformation of the beam portions 20 is ensured. That is, regardless of the presence of the reinforcing member 12 provided to increase the lateral stiffness, collision energy is appropriately absorbed by the deformation of each part, and excellent shock absorbing performance is obtained.

Figure 5A:
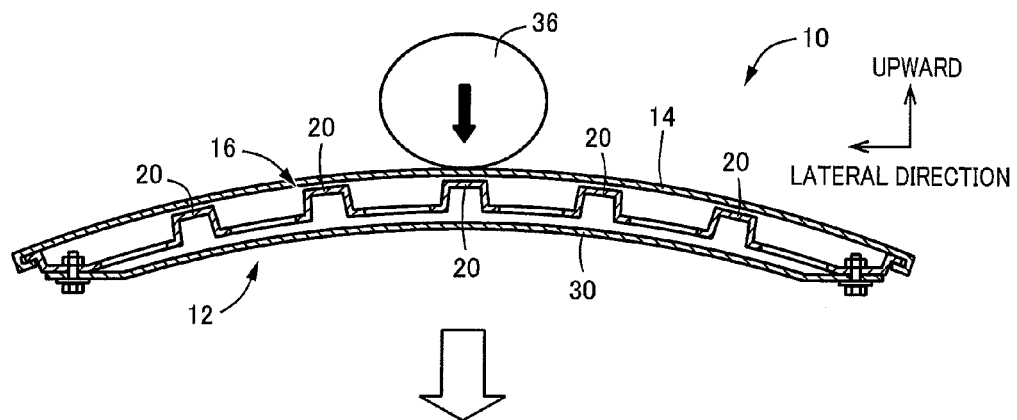
FIG. 5 shows diagrams showing step by step an example of how the shape of each part changes in the case where the colliding body collides with the vehicle hood in FIG. 1, and the figure being sectional views corresponding to FIG. 2.
Figure 5B:
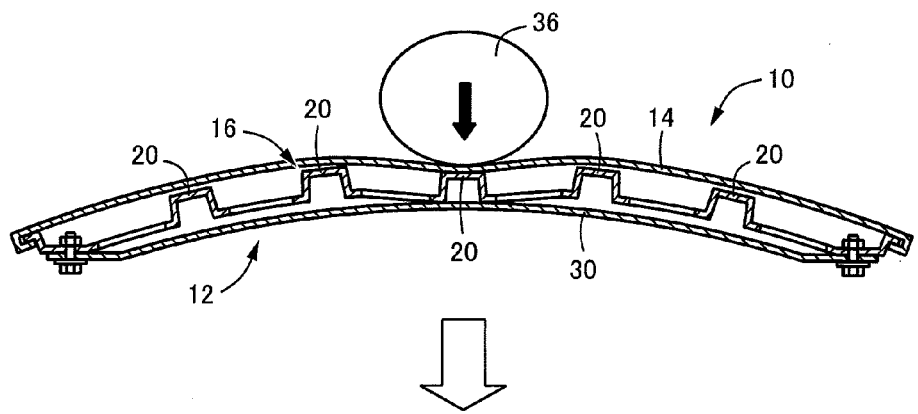

FIG. 5 shows diagrams showing step by step an example of how the shape of each part changes in the case where the colliding body 36 collides with the vehicle hood 10 from above the vehicle. In the figure, a black arrow in the colliding body 36 represents a collision load. FIG. 5A shows the stage in which the colliding body 36 has come into contact with the outer panel 14 of the vehicle hood 10. At this time, the shape of the vehicle hood 10 is the same as its original shape shown in FIG. 2. FIG. 5B shows the state where the outer panel 14 has been flexurally deformed downward in the middle thereof, the inner panel 16 has also been deformed downward along with the deformation of the outer panel 14, and the beam portion 20 located in the middle of the inner panel 16 has been pressed on the opening side of the hat-shaped section against the reinforcing member 12. The impact on the colliding body 36 is reduced by the deformation of the outer panel 14 and the inner panel 16. Since only the outer panel 14 and the inner panel 16 are deformed in the stages of FIGS. 5A and 5B, and the impact in case of a slight collision is appropriately reduced.

Figure 5C:
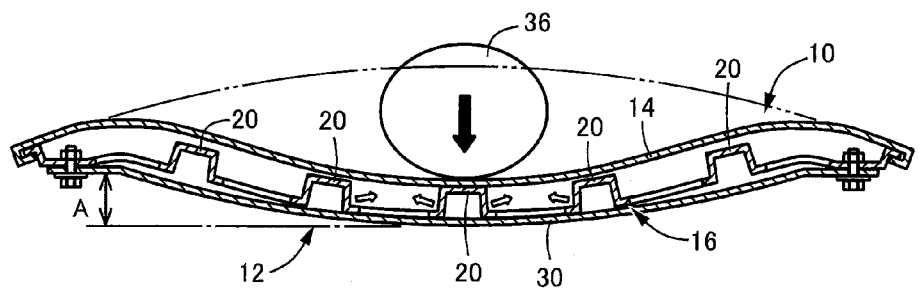

FIG. 5C shows the state where the outer panel 14 has been further deformed downward by the colliding body 36, and the reinforcing member 12 as well as the inner panel 16 has been deformed to be curved in the opposite direction. In this state, the impact is reduced and collision energy is absorbed by the deformation of the outer panel 14, the inner panel 16, and the reinforcing member 12. In particular, in the deformation process from FIG. 5A to FIG. 5C or in the state of FIG. 5C, the beam portions 20 are deformed to open outward on the opening side of the hat-shaped section along the reinforcing member 12, and collision energy is appropriately absorbed by the deformation. The central portion of the inner panel 16, namely the portion of the inner panel 16 where the beam portions 20 are provided, can shift relative to the reinforcing member 12. Accordingly, the central portion of the inner panel 16 is shifted relative to the reinforcing member 12 according to the position of collision with the colliding body 36, the load direction, etc., whereby the collision load is released and the impact is appropriately reduced.

If the state shown in FIG. 5C is the state of maximum deformation of the vehicle hood 10, the impact of collision with the component 18 is avoided by setting round dimension A in FIG. 5C to such a value that the vehicle hood 10 does not contact with the component 18 located inside the vehicle hood 10. Even if the vehicle hood 10 collides with the component 18 before reaching the maximum deformation, the inner panel 16 is less likely to contact with the component 18 due to the presence of the reinforcing member 12. The deformation is therefore less likely to be hindered by, e.g., the beam portions 20 of the inner panel 16 being caught by the component 18, and shock absorbing performance due to the deformation of the beam portions 20 is appropriately ensured. A long dashed double-short dashed line in FIG. 5C represents the initial shape of the surface of the outer panel 14.

Other embodiments of the present invention will be described below. In the following embodiments, the portions substantially the same as those of the above embodiment are denoted with the same reference characters, and detailed description thereof will be omitted.

Figure 6:
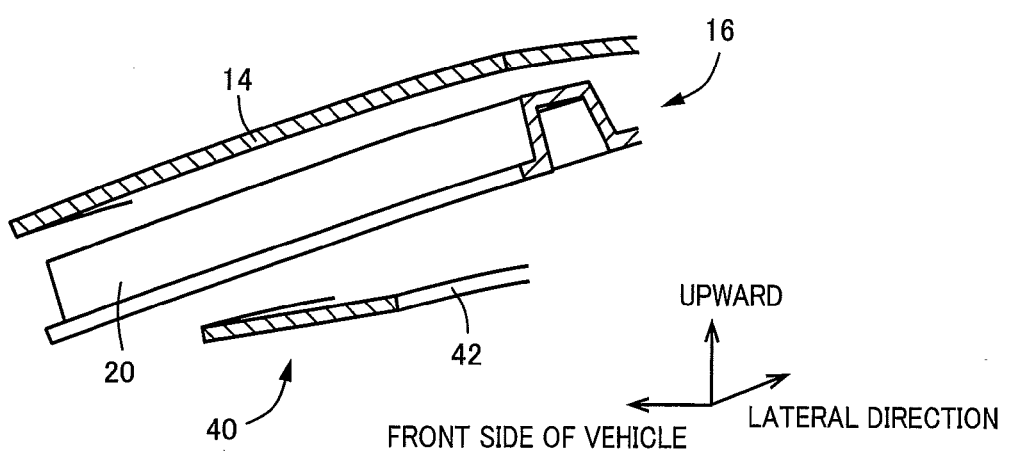
FIG. 6 is a perspective view corresponding to FIG. 3 in the case where a reinforcing member is disposed in a tilted attitude with respect to the beam portions, and the figure illustrating another embodiment of the present invention.

FIG. 6 is a perspective view corresponding to FIG. 3. A reinforcing member 40 is disposed in such a tilted attitude that the size of clearance between the reinforcing member 40 and the beam portions 20 changes in the longitudinal direction of the vehicle. Specifically, a curved portion 42 curved so as to correspond to the curved shape of the inner panel 16 in the lateral direction of the vehicle is tilted so that the clearance between the curved portion 42 and the beam portions 20 is larger on the rear side of the vehicle than on the front side of the vehicle. In this case, when the beam portions 20 of the inner panel 16 are pressed against the reinforcing member 40 upon collision with the colliding body 36, the beam portions 20 partially contact with the reinforcing member 40. An initial load is thus reduced, and the reaction force of the reinforcing member 40 is gradually increased. The impact on the colliding body 36 is therefore appropriately reduced.

Figure 7:
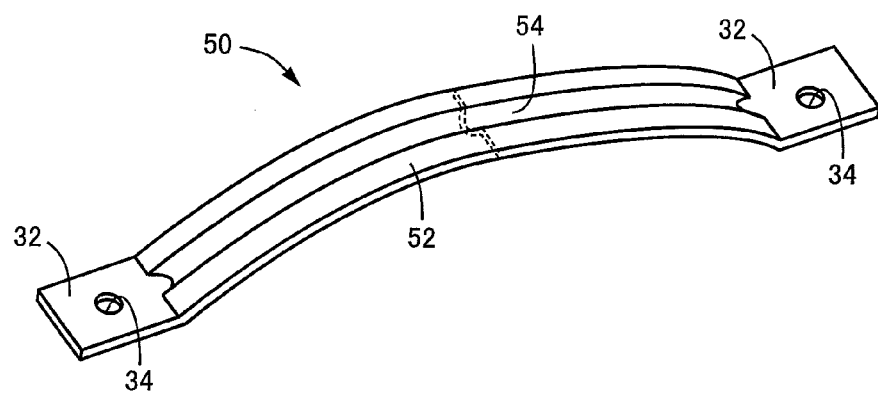
FIG. 7 is a perspective view corresponding to FIG. 4 in the case where a reinforcing member has a bead.

FIG. 7 is a perspective view corresponding to FIG. 4. A reinforcing member 50 has a curved portion 52 formed in a curved shape like the curved portion 30 or 42, and the attachment portions 32 are formed integrally with the curved portion 52 at both ends of the curved portion 52. A bead 54 having a semicircular section protruding downward is formed in the curved portion 52 so as to extend in the longitudinal direction of the curved portion 52, namely the lateral direction of the vehicle. Only one bead 54 is provided in the middle in the lateral direction of the curved portion 52 having an elongated shape (the longitudinal direction of the vehicle) and extends along the entire length in the longitudinal direction of the curved portion 52. The bead 54 can be easily formed by press drawing etc. In this case, since the bead 54 increases stiffness of the reinforcing member 50, the lateral stiffness of the vehicle hood 10 can further be improved. Moreover, since the curved portion 52 of the reinforcing member 50 including the bead 54 is deformed upon collision with the colliding body 36, collision energy absorption performance can further be enhanced.

Figure 8:
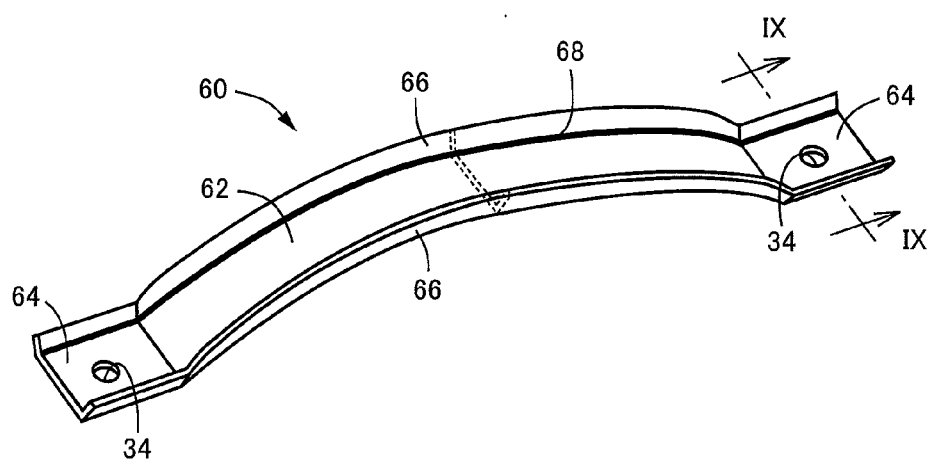
FIG. 8 is a perspective view corresponding to FIG. 4 in the case where a reinforcing member has a dish-shaped section.
Figure 10:
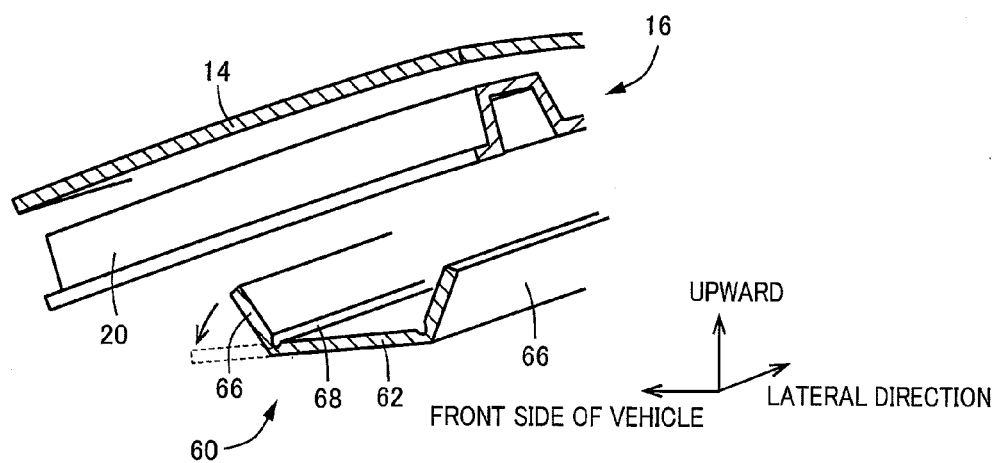
FIG. 10 is a perspective view corresponding to FIG. 3 in the case where the reinforcing member in FIG. 8 is disposed in a tilted attitude with respect to the beam portions.

FIG. 8 is a perspective view corresponding to FIG. 4. A reinforcing member 60 includes a curved portion 62 formed in a curved shape like the curved portion 30 or 42, and a pair of attachment portions 64 formed integrally with the curved portion 62 and each having an insertion hole 34 like the attachment portion 32. The reinforcing member 60 has sidewalls 66 on its both sides in the lateral direction perpendicular to the longitudinal direction of the reinforcing member 60, namely on its both sides in the longitudinal direction of the vehicle. The sidewalls 66 are formed so as to protrude upward and to extend along the entire length of the curved portion 62 and the attachment portions 64, and the reinforcing member 60 has a dish-shaped section. A pair of the sidewalls 66 are tilted outward so as to open outward toward their tip ends, and a groove 68 is formed in the inner corner at a root portion of each sidewall 66. The grooves 68 correspond to a deformation facilitating portion, and make it easier for the sidewalls 66 to be deformed to fall outward as shown by a dotted line in FIG. 10 when the sidewalls 66 contact with the beam portions 20. FIG. 10 is a perspective view corresponding to FIG. 3, showing the case where the curved portion 62 is disposed in a tilted attitude like the curved portion 42. In this case, the sidewall 66 on the front side of the vehicle first comes into contact with the beam portion 20 and is deformed to fall.

Figure 9:
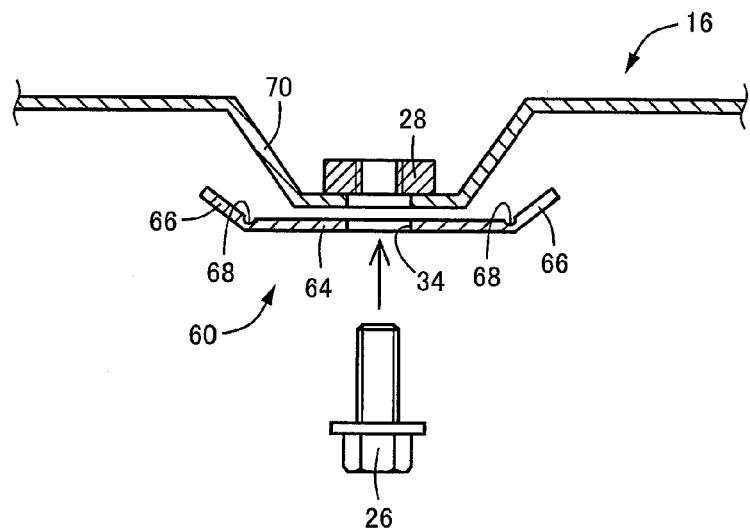
FIG. 9 is an enlarged sectional view taken along and viewed in the direction shown by arrows IX-IX in FIG. 8, showing the reinforcing member together with the inner panel.

FIG. 9 is a sectional view taken along and viewed in the direction shown by arrows IX-IX in FIG. 8, showing the reinforcing member 60 together with the inner panel 16. A base portion 70 protruding downward in a trapezoidal shape is formed integrally with each of the portions to which the attachment portion 64 is attached by the screw 26, such that the base portion 70 does not interfere with the sidewalls 66. The nut 28 is fixedly attached to the upper surface of the base portion 70, namely to the opposite side of the base portion 70 from the side to which the reinforcing member 60 is attached. The screw 26 inserted through the insertion hole 34 is tightened into the nut 28, whereby the end of the reinforcing member 60, namely the attachment portion 64, is fixedly fastened to the inner panel 16 such that the sidewalls 66 do not interfere with the inner panel 16.

According to such a reinforcing member 60, the pair of sidewalls 66 are formed so that the reinforcing member 60 has a dish-shaped section that opens upward. This increases stiffness of the reinforcing member 60, and therefore the lateral stiffness of the vehicle hood 10 can further be improved. Moreover, since the beam portions 20 of the inner panel 16 are pressed against the reinforcing member 60 and the sidewalls 66 are deformed from the dish shape upon collision with the colliding body 36, collision energy absorption performance can further be enhanced.

Since the grooves 68 that facilitate deformation of the sidewalls 66 are formed in the corners of the dish shape, the sidewalls 66 are easily deformed to fall outward when the beam portions 20 of the inner panel 16 are pressed against the reinforcing member 60 upon collision with the colliding body 36. An initial load is thus reduced. Moreover, with the sidewalls 66 having fallen outward, the curved portion 62 is flexurally deformed relatively easily like the reinforcing member 12, and therefore exertion of excessive impact on the colliding body 36 is suppressed regardless of the increased stiffness. In particular, in the present embodiment, the curved portion 62 is disposed in a tilted attitude in the longitudinal direction of the vehicle with respect to the beam portions 20 so that the curved portion 62 partially contacts with the beam portions 20. Moreover, the sidewalls 66 are tilted outward. This can effectively reduce the initial load that is applied when the beam portions 20 come into contact with the reinforcing member 60.

Figure 11:
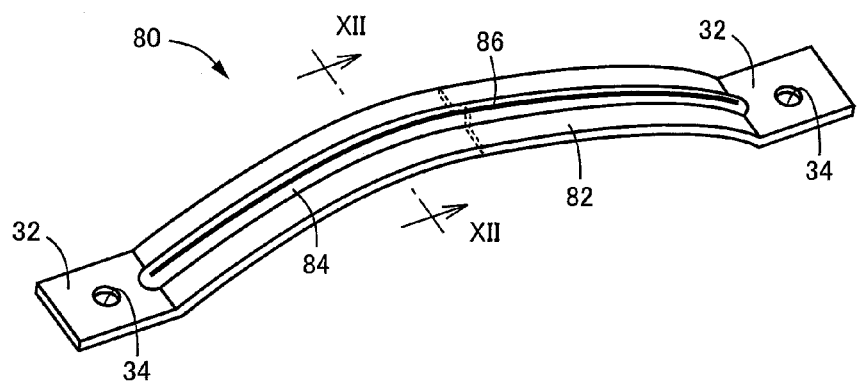
FIG. 11 is a perspective view corresponding to FIG. 4 in the case where a reinforcing member has a bead in which a groove-like cutout is formed in the middle of the bead.
Figure 12:
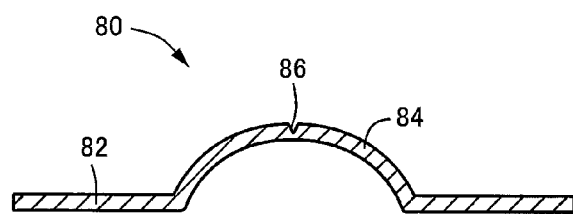
FIG. 12 is an enlarged sectional view taken along and viewed in the direction shown by arrows XII-XII in FIG. 11.

FIG. 11 is a perspective view corresponding to FIG. 4. FIG. 12 is an enlarged sectional view taken along and viewed in the direction shown by arrows XII-XII in FIG. 11.

A reinforcing member 80 has a curved portion 82 formed in a curved shape like the curved portion 30 or 42. The attachment portions 32 are formed integrally with the curved portion 82 at both ends of the curved portion 82. A bead 84 having a semicircular section protruding upward is formed in the curved portion 82 so as to extend in the longitudinal direction of the curved portion 82, namely the lateral direction of the vehicle. Only one bead 84 is provided in the middle in the lateral direction of the curved portion 82 having an elongated shape (the longitudinal direction of the vehicle) and extends along the entire length in the longitudinal direction of the curved portion 82. The bead 84 can be easily formed by press drawing etc. A groove-like cutout 86 having a V-shaped section is formed in the middle of the bead 84 so as to extend along substantially the entire length in the longitudinal direction of the bead 84.

In this case, since the bead 84 increases stiffness of the reinforcing member 80 as in the case of the reinforcing member 50, the lateral stiffness of the vehicle hood 10 can further be improved. Moreover, since the curved portion 82 of the reinforcing member 80 including the bead 84 is deformed upon collision with the colliding body 36, collision energy absorption performance can further be enhanced. Since the cutout 86 is formed in the middle of the bead 84, the curved portion 82 is relatively easily deformed, and therefore exertion of excessive impact on the colliding body 36 is suppressed regardless of the increased stiffness due to the bead 84. The cutout 86 may have a U-shaped section, an arc-shaped section, a rectangular section, etc., and may be formed only in a part (the middle etc.) in the longitudinal direction of the bead 84. As in the present embodiment, the cutout 86 serving as the deformation facilitating portion may be formed in the curved portions 30, 42, 62 and the bead 54 of the above embodiments.

Figure 13:
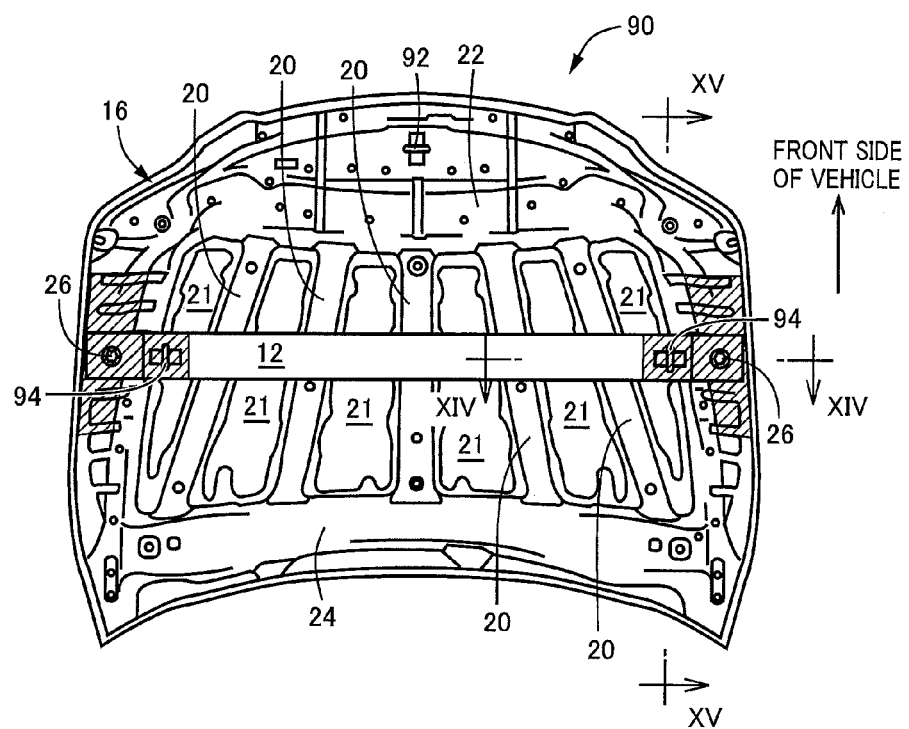
FIG. 13 is a front view corresponding to FIG. 1, and the figure illustrating another vehicle hood to which the present invention is applied.
Figure 14:
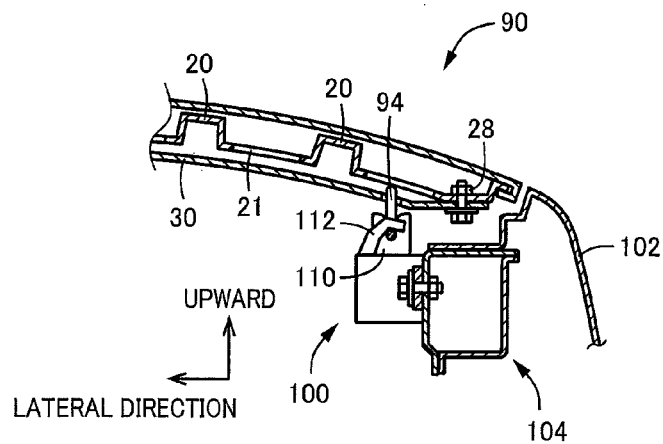
FIG. 14 is a sectional view taken along and viewed in the direction shown by arrows XIV-XIV in FIG. 13, showing the reinforcing member together with a hood lock device coupled to a vehicle body.
Figure 15:
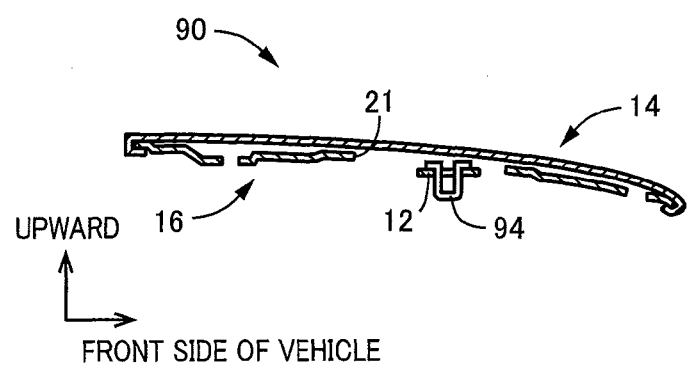
FIG. 15 is a sectional view taken along and viewed in the direction shown by arrows XV-XV in FIG. 13.
Figure 18:
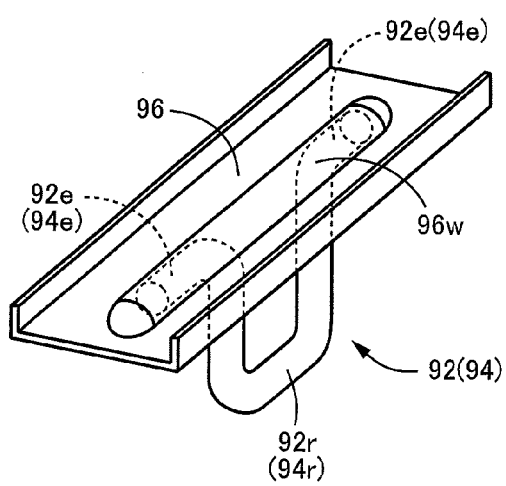
FIG. 18 is a perspective view of an example in the case where the strikers are attached (to the inner panel or the reinforcing member) via a bracket.

FIG. 13 is a front view corresponding to FIG. 1. FIG. 14 is an enlarged sectional view taken along and viewed in the direction shown by arrows XIV-XIV in FIG. 13. FIG. 15 is a sectional view taken along and viewed in the direction shown by arrows XV-XV in FIG. 13. A vehicle hood 90 is different from the vehicle hood 10 in that a pair of hood lock strikers 94 are provided near the middle on both right and left sides of the vehicle hood 90, in addition to a hood lock striker 92 provided near the middle in the front end of the vehicle hood 90. The striker 92 is attached to the inner panel 16, whereas the strikers 94 are attached to both ends in the longitudinal direction of the reinforcing member 12 (more precisely, the ends of the curved portion 30). These strikers 92, 94 are formed by bending a round bar into the shape of a hat section. Both ends of the strikers 92, 94 may be directly fixed to the inner panel 16 or the reinforcing member 12 by arc welding etc. Alternatively, as shown in, e.g., FIG. 18, both ends 92e, 94e of the strikers 92, 94 may be fixed to a bracket 96 by arc welding etc., and the bracket 96 may be placed on the back surface (upper surface) of the inner panel 16 or the reinforcing member 12 and fixed thereto by spot welding etc. The bracket 96 has an accommodating portion 96w having a semicircular section, and the both ends 92e, 94e are accommodated and positioned in the accommodating portion 96w and is firmly fixed therein. The inner panel 16 and the reinforcing member 12 have insertion holes that allow retaining portions 92r, 94r of the strikers 92, 94 to protrude downward therethrough.

Figure 17:
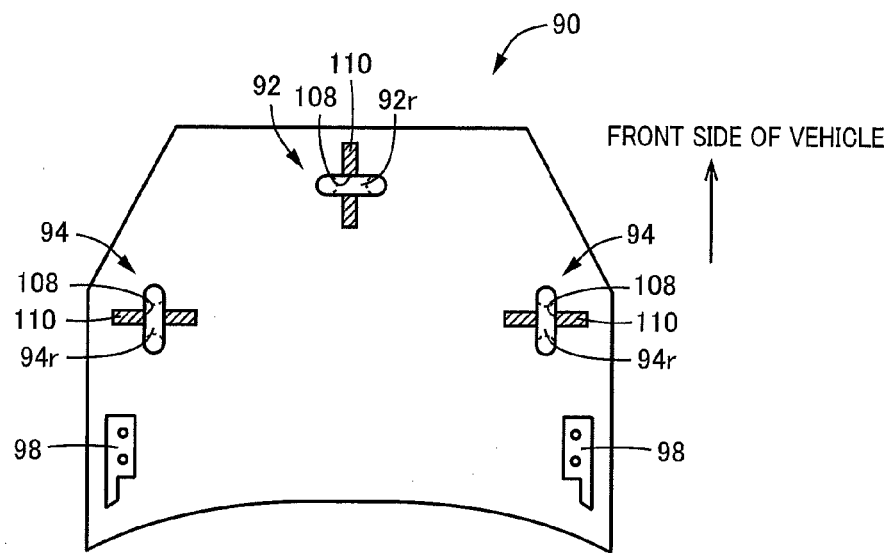
FIG. 17 is a front view schematically illustrating the attitude in which three strikers are disposed in the vehicle hood in FIG. 13.

FIG. 17 is a front view corresponding to FIG. 13, schematically illustrating the attitude in which each striker 92, 94 is disposed. The striker 92 in the front end is attached in such an attitude that the retaining portion 92r extends substantially parallel to the lateral direction of the vehicle. The pair of strikers 94 on the right and left sides are attached in such an attitude that the retaining portions 94r extend substantially parallel to the longitudinal direction of the vehicle. A pair of hinge attachment members 98, to which hinges for coupling the vehicle hood 90 to a vehicle body so that the vehicle hood 90 can be opened and closed are attached, are fixed to both right and left sides of the rear end of the vehicle hood 90.

Figure 16:
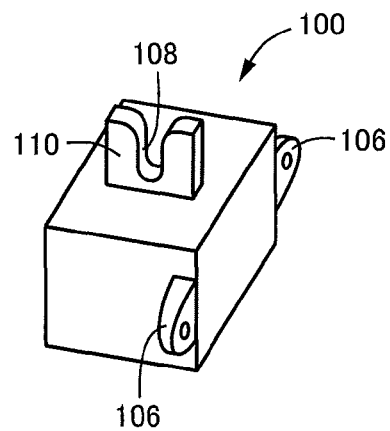
FIG. 16 is a schematic perspective view of the hood lock device in FIG. 14.

As shown in FIG. 14, the vehicle body is provided with a hood lock device 100. The vehicle hood 90 is held (locked) closed when the strikers 92, 94 are latched by the hood lock device 100. The hood lock device 100 is provided at three positions corresponding to the three strikers 92, 94. FIG. 14 is a view showing the hood lock device 100 that latches the right striker 94 in FIG. 13, and this hood lock device 100 is fixed to an apron upper member 104 to which a fender 102 etc. is attached. FIG. 16 is a schematic perspective view of the hood lock device 100. The hood lock device 100 has a pair of attachment portions 106, and is fixed to the apron upper member 104 via the attachment portions 106 by bolts etc. The hood lock device 100 further has a guide 110 having a guide groove 108 and protruding upward, and the retaining portion 92r, 94r of the striker 92, 94 is inserted into the guide groove 108. Although not shown in FIG. 16, the hood lock device 100 further has a pivotable latch 112 as shown in FIG. 14. The latch 112 is retained on the retaining portion 92r, 94r according to a biasing force of biasing means (a spring etc.), not shown, to prevent the retaining portion 92r, 94r from coming off upward from the guide groove 108.

Figure 19:
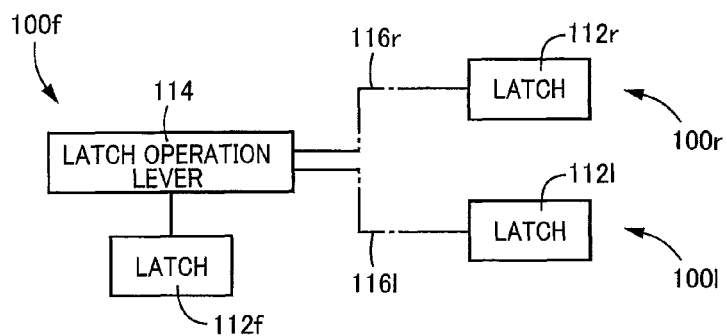
FIG. 19 is a block diagram illustrating a mechanism which mechanically releases three hood lock devices with an operation of a single latch operation lever.

When the retaining portion 92r, 94r is inserted into the guide groove 108 from above, the latch 112 pivots in the leftward direction in FIG. 14 to withdraw against the biasing force of the biasing means by engagement with the retaining portion 92r, 94r, and thus allows the retaining portion 92r, 94r to be inserted into the guide groove 108. When the retaining portion 92r, 94r is completely inserted in the guide groove 108, the latch 112 pivots in the rightward direction in FIG. 14 according to the biasing force of the biasing means, and is retained on the retaining portion 92r, 94r as shown in FIG. 14. As shown in FIG. 19, a hood lock device 100f in the front end, which corresponds to the striker 92, includes a latch operation lever 114. By operating the latch operation lever 114 after a hood unlock lever provided in a passenger compartment is operated, a latch 112f can be mechanically caused to pivot to release the retaining portion 92r. For example, the latch operation lever 114 is formed integrally with the latch 112f so as to protrude from the latch 112f. Hood lock devices 100r, 100l on the right and left sides, which correspond to the pair of strikers 94, do not have the latch operation lever 114. When the latch operation lever 114 of the hood lock device 100f in the front end is operated, latches 112r, 112l are caused to pivot accordingly via mechanical linking devices 116r, 116l such as cables to release the retaining portions 94r. That is, by merely operating the latch operation lever 114 of the hood lock device 100f in the front end, all of the three hood lock devices 100f, 100r, 100l can be unlocked and the vehicle hood 90 can be lifted upward and opened. In FIG. 19, the letters "f," "r," and "l" are used to identify the three hood lock devices 100 and the three latches 112.

The retaining portions 94r may be released by causing the latches 112r, 112l of the hood lock devices 100r, 100l on the right and left sides to pivot according to the operation of the latch operation lever 114 of the hood lock device 100f in the front end by using an electric motor etc. Alternatively, the retaining portions 94r may be released by mechanically or electrically causing the latches 112r, 112l of the hood lock devices 100r, 100l on the right and left sides to pivot when the hood unlock lever in the passenger compartment is operated.

According to the vehicle hood 90 of the present embodiment, the hood lock strikers 94 are attached to the right and left sides of the vehicle hood 90, and the vehicle hood 90 is held (locked) closed by latching the strikers 94 by the hood lock devices 100 provided on the apron upper members 104. Since the right and left sides of the vehicle hood 90 are thus fixed to a vehicle body-side member, the lateral stiffness of the vehicle hood 90 is further improved, and a collision load applied to one of the right and left sides (the fender 102 etc.) is transmitted to the other side via the reinforcing member 12. The load is thus dispersed and local damage is suppressed. In particular, in the present embodiment, since the pair of strikers 94 are attached to the reinforcing member 12, the collision load applied to one of the sides is more appropriately transmitted to the other side via the reinforcing member 12. Although the strikers 94 may be attached to the inner panel 16, it is desirable to attach the strikers 94 at positions near the reinforcing member 12, for example, in shaded region in FIG. 13, in order for the collision load to be appropriately transmitted via the reinforcing member 12.

The pair of strikers 94 on the right and left sides are attached in such an attitude that the retaining portions 94r extend substantially parallel to the longitudinal direction of the vehicle. Shifting of the strikers 94 in the lateral direction of the vehicle is restricted as the retaining portions 94r are inserted in the guide grooves 108 of the guides 110. This further improves the lateral stiffness of the vehicle hood 90.

The striker 92 in the front end is attached in such an attitude that the retaining portion 92r extends substantially parallel to the lateral direction of the vehicle. Shifting of the striker 92 in the longitudinal direction of the vehicle is restricted as the retaining portion 92r is inserted in the guide groove 108 of the guide 110. This together with the hinges attached to the hinge attachment members 98 in the rear part further improves longitudinal stiffness (surface stiffness in the longitudinal direction of the vehicle) of the vehicle hood 90. That is, the improved longitudinal stiffness together with the improved lateral stiffness appropriately improves the overall stiffness of the vehicle hood 90. The vehicle hood 10 in FIG. 1 is locked by a single striker 120 provided in the front end. The striker 120 is attached in such an attitude that its retaining portion extends longitudinally, namely substantially parallel to the longitudinal direction of the vehicle, as in conventional examples.

Figure 20:
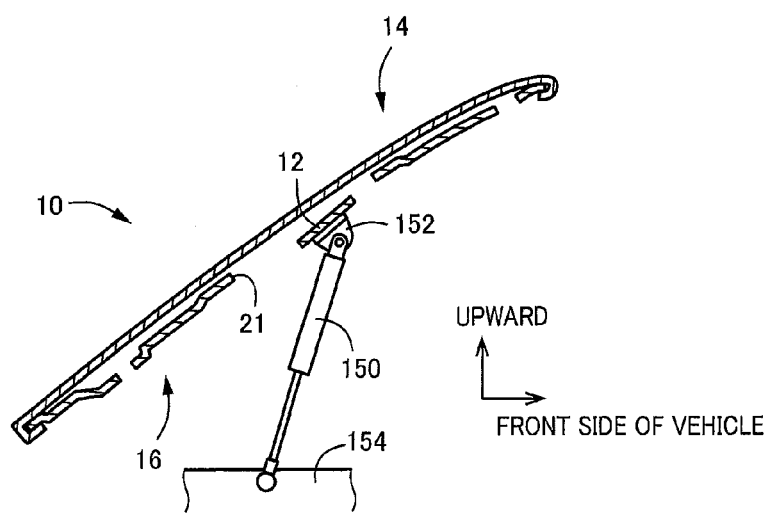
FIG. 20 is a sectional view corresponding to FIG. 15 in the case where a hood opening/closing damper is coupled to the reinforcing member, the figure illustrating another embodiment of the present invention.

FIG. 20 is a sectional view corresponding to FIG. 15, showing the state where the vehicle hood 10 is opened. Damper coupling brackets 152 are fixedly fastened to both ends in the longitudinal direction of the reinforcing member 12 (more precisely, the ends of the curved portion 30) by bolts, welding, etc. The damper coupling bracket 152 is a coupling portion that couples with a hood opening/closing damper 150. The hood opening/closing damper 150 has its one end coupled to a vehicle body-side member 154 such as the apron upper member 104, and the other end coupled to the damper coupling bracket 152. The both ends of the hood opening/closing damper 150 are coupled so as to be pivotable about coupling shafts extending substantially horizontally and substantially parallel to the lateral direction of the vehicle. As the hood opening/closing dampers 150 are extended by a biasing force such as a gas pressure, the vehicle hood 10 is automatically opened upward as shown in the figure. By pivoting the tip end of the vehicle hood 10 downward while retracting the hood opening/closing dampers 150 against the biasing force, the vehicle hood 10 can be closed so as to extend substantially horizontally and can be locked by the hood lock devices 100.

In this case, a pair of the damper coupling brackets 152 are fixed to the both ends of the reinforcing member 12, and the hood opening/closing dampers 150 are coupled thereto. Accordingly, a reaction force that is applied from the dampers 150 when the hood is opened or closed is transmitted to the inner panel 16 via the reinforcing member 12. This can suppress deformation of the inner panel 16 due to the reaction force, and can reduce the thickness and weight of the inner panel 16.

Although the embodiments of the present invention are described above in detail based on the drawings, the embodiments are shown by way of example only, and the present invention can be embodied in various modified or improved forms based on the knowledge of those skilled in the art.

NOMENCLATURE OF ELEMENTS 10, 90: vehicle hood 12, 40, 50, 60, 80: reinforcing member 14: outer panel 16: inner panel 20: beam portions 36: colliding body 54, 84: bead 66: sidewalls 68: groove (deformation facilitating portion) 94: strikers 100: hood lock device 150: hood opening/closing damper 152: damper coupling bracket (coupling portion)

The invention claimed is:

1. A vehicle hood structure, which includes an outer panel that forms an outer surface of a vehicle, an inner panel that is disposed below the outer panel and fixedly attached to the outer panel and that has a plurality of beam portions extending in a longitudinal direction of the vehicle, having a hat-shaped section opening downward, and being separated from each other in a lateral direction of the vehicle, and which covers a front part of the vehicle, the vehicle hood structure comprising:

a reinforcing member that is disposed below the inner panel so as to extend in the lateral direction of the vehicle and to have clearance between the reinforcing member and the beam portions, that has a convex shape curved upward in the lateral direction of the vehicle, that is fixedly fastened at its both ends in the lateral direction of the vehicle to the inner panel, that has a dish-shaped section that has a dish shape, that opens upward, as taken perpendicularly to a longitudinal direction of the reinforcing member which is the lateral direction of the vehicle, and that is provided with a deformation facilitating portion that facilitates deformation of sidewalls on both sides of the dish shape in a corner of the dish shape.

2. The vehicle hood structure according to claim 1, wherein
the reinforcing member has a bead protruding upward or downward and extending in the longitudinal direction of the reinforcing member which is the lateral direction of the vehicle.

3. The vehicle hood structure according to claim 1, wherein
the reinforcing member is disposed in such a tilted attitude that a size of the clearance between the reinforcing member and the beam portions changes in the longitudinal direction of the vehicle.

4. The vehicle hood structure according to claim 1, wherein
a hood lock striker is attached to the reinforcing member or the inner panel on each of right and left sides of the vehicle hood structure.

5. The vehicle hood structure according to claim 1, wherein
a coupling portion for a hood opening/closing damper is provided on each end in the longitudinal direction of the reinforcing member which is the lateral direction of the vehicle.

6. A vehicle hood structure, which includes an outer panel that forms an outer surface of a vehicle, an inner panel that is disposed below the outer panel and fixedly attached to the outer panel and that has a plurality of beam portions extending in a longitudinal direction of the vehicle, having a hat-shaped section opening downward, and being separated from each other in a lateral direction of the vehicle, and which covers a front part of the vehicle, the vehicle hood structure comprising:
a reinforcing member that is disposed below the inner panel so as to extend in the lateral direction of the vehicle and to have clearance between the reinforcing member and the beam portions, that has a convex shape curved upward in the lateral direction of the vehicle, that has two ends and is fixedly fastened at both ends in the lateral direction of the vehicle to the inner panel, and that is disposed in such a tilted attitude that a size of the clearance between the reinforcing member and the beam portions changes in the longitudinal direction of the vehicle, and
a coupling portion for a hood opening/closing damper being provided on each end in the longitudinal direction of the reinforcing member which is the lateral direction of the vehicle.

7. The vehicle hood structure according to claim 6, wherein the reinforcing member has a bead protruding upward or downward and extending in a longitudinal direction of the reinforcing member which is the lateral direction of the vehicle.

8. The vehicle hood structure according to claim 6, wherein a hood lock striker is attached to the reinforcing member or the inner panel on each of right and left sides of the vehicle hood structure.

\* \* \* \* \*

UNITED STATES PATENT AND TRADEMARK OFFICE
CERTIFICATE OF CORRECTION

PATENT NO. : 9,688,313 B2  
APPLICATION NO. : 14/761590  
DATED : June 27, 2017  
INVENTOR(S) : Shimpei Chikada Page 1 of 1

It is certified that error appears in the above-identified patent and that said Letters Patent is hereby corrected as shown below:

On the Title Page

Page 2, under item (56), "Other Publications", please delete the following:
"Sep. 16, 2014 European Search Report Issued in European Application No. 13874765.4."
And replace with:
Sep. 14, 2016 European Search Report Issued in European Application No. 13874765.4.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*